Feb. 25, 1969 H. I. CHAMBERS 3,430,253

OSCILLOGRAPH WITH MEANS FOR PROVIDING SECOND RECORD OF THE INPUT

Filed Nov. 8, 1967

INVENTOR.
HERBERT I. CHAMBERS

BY Raymond A. Andrews

ATTORNEY.

United States Patent Office 3,430,253
Patented Feb. 25, 1969

3,430,253
OSCILLOGRAPH WITH MEANS FOR PROVIDING SECOND RECORD OF THE INPUT

Herbert I. Chambers, Arcadia, Calif., assignor to Consolidated Electrodynamics Corporation, Pasadena, Calif., a corporation of California Filed Nov. 8, 1967, Ser. No. 681,363
U.S. Cl. 346—66 18 Claims
Int. Cl. G01d 9/30

ABSTRACT OF THE DISCLOSURE

Recording apparatus comprising means for deflecting a beam of light in accordance with variable information, beam responsive means for providing electric signals corresponding to the deflection of the beam, and means responsive to said electric signals for providing an information record on a recording medium.

CROSS-REFERENCES TO RELATED APPLICATIONS

Applicant has no related applications as of the filing date of the subject application.

BACKGROUND OF THE INVENTION

*Field of the invention*

The subject invention relates to information recording apparatus and, more particularly, to recording apparatus employing one or more beams of electromagnetic radiation, such as light.

*Description of the prior art*

Conventional oscillograph apparatus provide an analog recording of a variable input signal by a well-known technique which includes the recording, on a continuously advancing light-sensitive medium, of a trace of a light beam which is deflected in accordance with variations of the input signal.

The resulting oscillograms in general are highly useful in that they present a visible record of the input signal as a function of time and thus permit valuable conclusions about the processes or parameters that participated in the formation of the input signal.

However, it is not always easy to reach valid conclusions from an observation of undulating traces. In many instances it is necessary or would at least be helpful to have recorded indices that accompany the oscillogram to permit instant spot checks thereof or facilitate its interpretation. Accordingly, some modern oscillograph systems include apparatus for recording characters on the oscillograph paper in addition to the oscillogram. From an economical as well as technical point of view, these systems have the disadvantage of a duplication of apparatus, as the character printing equipment is in addition to the galvanometer system of the oscillograph.

SUMMARY OF THE INVENTION

The subject invention overcomes the latter disadvantage and generally provides new and useful recording apparatus.

From one aspect thereof, the invention can be viewed as an improvement in an oscillograph apparatus in which an oscillogram of a variable input signal is recorded on a light-sensitive recording medium by means of a beam of light reflected by a galvanometer mirror which is angularly deflected in response to the input signal.

According to the invention, the improvement comprises means responsive to angular deflections of the mentioned galvanometer mirror for recording indices indicative of at least one predetermined characteristic, such as the amplitude, of the above mentioned input signal on the recording medium. These indices are recorded on the medium, which may be light sensitive oscillograph paper, in addition to the above mentioned oscillogram. However, it would also be feasible to record the indices on a separate recording medium or paper.

In this manner, spot checks are facilitated, as is the interpretation of the oscillogram.

From another aspect thereof, the subject invention provides recording apparatus comprising means for generating a first beam and a second beam of electromagnetic radiation, such as light, means responsive to variable information for deflecting the first beam in a first plane and the second beam in a second plane by amounts of deflection corresponding to variations of the mentioned information, and means for moving a recording medium through the first plane to provide on the recording medium a first information record by action of the first beam.

This apparatus further includes means located to be intercepted by the second plane for producing electric signals corresponding to amounts of deflection of the second beam, and means responsive to the electric signals thus produced for providing a second record of the mentioned information.

The second record just mentioned may be recorded on a separate medium, but it is preferred to record both the first and the second record on the same medium if the latter is to serve as an aid to the interpretation of the former.

BRIEF DESCRIPTION OF THE DRAWINGS

The subject invention will be more fully understood from the following detailed description of preferred embodiments thereof, illustrated by way of example in the accompanying drawings, in which.

DESCRIPTION OF THE PREFERRED EMBODIMENTS

Figures 1, 2, 4, 5:
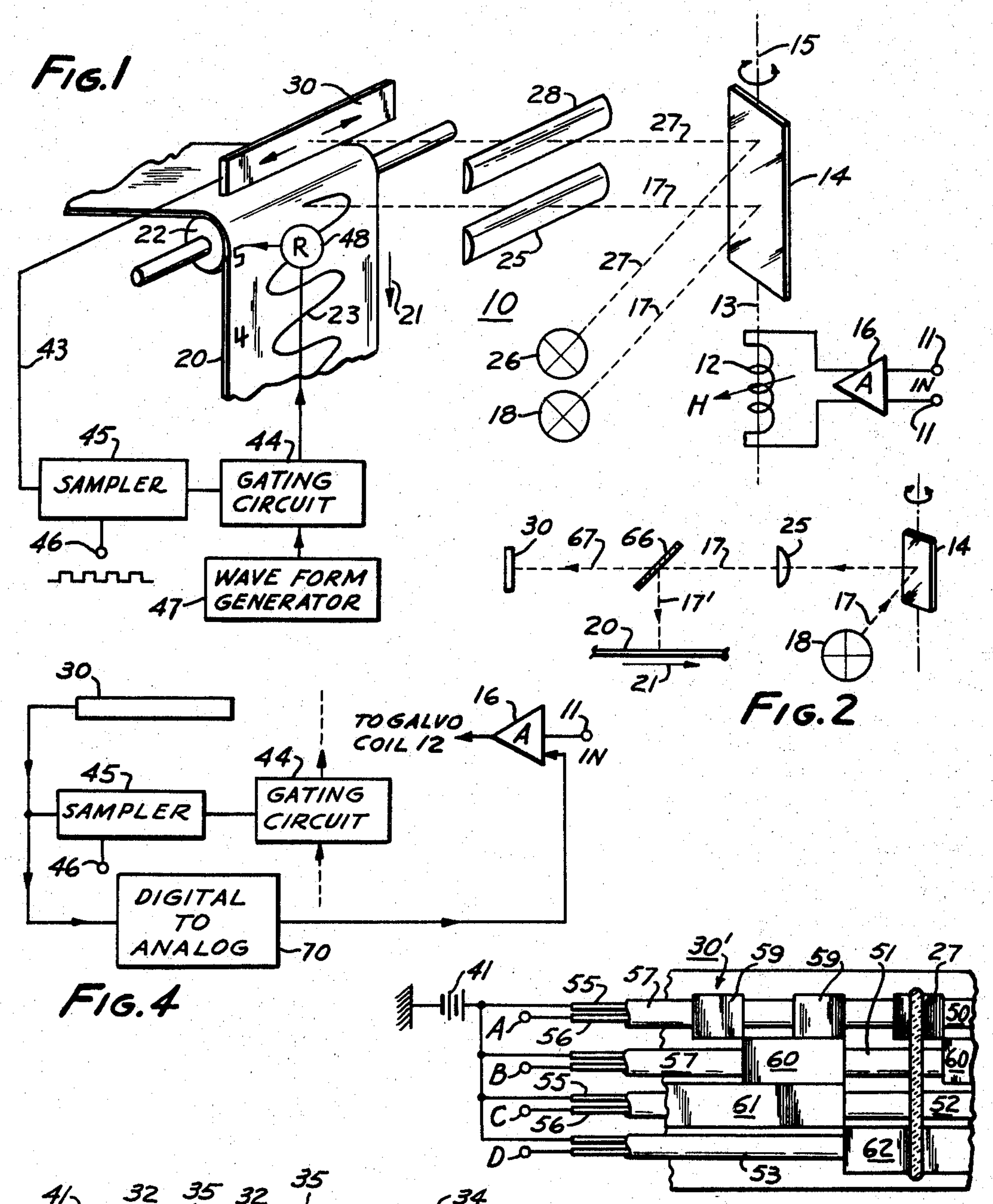
FIG. 1 is a schematic view and block diagram of an oscillograph apparatus in accordance with a preferred embodiment of the invention.
FIG. 2 illustrates a modification of the apparatus of FIG. 1.
FIG. 4 is a block diagram of a feedback circuit that may be provided in the apparatus of FIG. 1 or 2.
FIG. 5 illustrates a modification of the signal producing means shown in FIG. 3.

The oscillograph apparatus 10 illustrated in FIG. 1 includes input terminals 11 for receiving a variable input signal to be recorded. An amplifier 16 is connected to the terminals 11 for amplifying the input signal. The amplified input signal is applied to a schematically illustrated coil 12 of a galvanometer 13. The coil 12 is mounted in a magnetic field H and angularly deflects a mirror 14 about an axis 15 in a manner well known in the art.

A light beam 17 is projected from a light source 18 onto the mirror 14 which reflects and angularly deflects the beam 17 in a first plane in accordance with variations of the input signal received at terminals 11.

A supply of light-sensitive or oscillograph paper 20 is drawn by conventional equipment (not shown) in the direction of arrow 21 and over a roller 22. The roller 22 is so disposed that the recording paper 20 is drawn through the plane of deflection of the light beam 17 whereby an oscillogram 23 of the input signal received at the terminals 11 may be recorded on the medium 20. A collimating lens 25 serves to focus the beam 25 onto the paper 20.

As mentioned above, oscillograms in the form of undulating traces, while highly useful as such, are often difficult to interpret or spot check. To alleviate this difficulty, the apparatus of FIG. 1 includes a second light source 26 which projects a second beam of light 27 onto the galvanometer mirror 14.

The mirror 14 reflects the second beam 27 and angularly deflects this beam in a second plane in accordance with variations of the input signal received at the terminals 11. The second beam 27 traverses a collimating lens 28 and strikes an elongate photosensitive transducer 30 which is positioned to be intersected by the plane of deflection of the beam 27.

Figure 3:
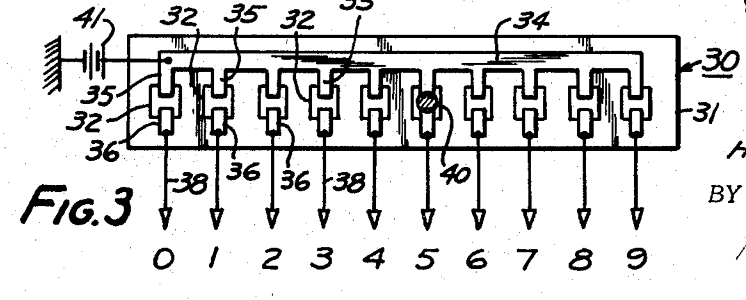
FIG. 3 is a section through a photosensitive signal producing means employed in the apparatus of FIG. 1 or 2.

The transducer 30 serves to translate angular deflections of the beam 27 into corresponding electric signals. A preferred embodiment of the transducer 30 is shown in FIG. 3. In that figure the transducer 30 is shown at a digitizer or analog to decimal converter.

More specifically, the transducer 30 of FIG. 3 has an insulating support 31 which carries a number of photoconductive elements 32. A common electrode 34 has fingers 35 which extend onto the photoconductive elements 32 as shown.

Each photoconductive element 32 is further provided with an individual electrode 36 which extends onto it in spaced relation to the corresponding finger 35 of the common electrode 34. The elements 32 may be made of cadmium sulfide or cadmium selenide, or of another material which substantially lowers its resistance in response to light impact.

Each of the electrodes 36 has a lead 38 connected thereto. These leads are labeled in FIG. 3 by decimal digits 0 through 9.

The light spot produced by the beam 27 on the transducer 30 is shown at 40. In FIG. 3, this light spot 40 is illustrated as impinging on the photoconductive element 32 associated with the digit 5. When the spot 40 is so located, a circuit is established for the flow of electric current from a source or battery 41 to the lead 5. By laterally deflecting the beam 27, a similar circuit may be established with respect to any one of the leads 0 through 9.

The leads 0 through 9, which in FIG. 1 are jointly designated by the common reference numeral 43, are connected to a gating circuit 44 through a sampler 45. This sampler may include an individual gate circuit for each of the leads 0 through 9. A common terminal 46 is connected to the gating signal inputs of all gate circuits in the sampler 45. The terminal 46 may be connected to a conventional clock pulse source (not shown) which periodically renders the gates in the sampler 45 effective to apply a signal from any one of the leads 0 through 9 to the gating circuit 44. The gating circuit 44 has an input connected to a waveform generator 47 and an output connected to a character recording device 48.

The gating circuit 44, the waveform generator 47 and the recording device 48 may be of the type disclosed in U.S. Patent 3,208,075, issued Sept. 21, 1965, to Robert S. Casavant. According to that patent, alphanumeric characters are produced by generating suitable waveforms and by selectively gating these waveforms to an appropriate character recording device, such as a two-beam glavanometer structure.

According to a preferred embodiment of the apparatus shown in FIG. 1, the output leads of the sampler 45, which run from 0 through 9 as do its input leads (see FIG. 3), are respectively connected to the inputs 0 through 9 of the circuit shown in FIGS. 5A and 5B of the Casavant patent. The latter circuit is provided with suitable waveforms by the apparatus illustrated in FIG. 1 of the Casavant patent. One of the galvanometer structures shown in FIGS. 8 and 9 of the Casavant patent may, for example, be used as the character recording device 48. As illustrated in FIG. 1, the characters thus provided may be recorded in a marginal region of the recording medium.

In this manner, the oscillogram of a signal may be supplemented by indices indicative of a predetermined characteristic of the signal. For example, the oscillogram 23 may be provided with marginal indices that show instantaneous amplitude values of the signal applied at the input terminals 11.

In some applications it may be desirable to have a zero index printed when the beam 17 occupies its center position. In this case, the structure of the transducer 30 shown in FIG. 3 may be duplicated to provide for leads running from −9 to 0 and from 0 to +9 in a readily apparent manner. In such case, the waveform generator 47 and the gating circuit 44 have to be accordingly supplemented so that the character recording device 48 receives signals which run from −9 through +9 and which result in the recording of characters that distinguish between positive and negative values. As an example, two spaced recording devices could be used to record positive and negative numbers in different marginal regions of the recording medium 20.

Given the teaching so far advanced with respect to FIGS. 1 and 3, it is also within the reach of those skilled in the art to multiply the structure of the transducer 30 and supplement the circuits and equipment connected thereto so that unit and decade characters may be recorded on the oscillograph paper 20 (compare FIG. 6 of the Casavant patent).

If desired, the structure of the transducer 30 may be modified to provide a binary output and the circuitry of the apparatus connected thereto may be modified to be responsive to a binary input as contemplated in column 4 of the Casavant patent.

A section of a transducer 30′ suitable for providing a binary output at terminals A, B, C and D is illustrated in FIG. 5. This transducer includes four photoelectric elements 50 through 53, each of which extends substantially over the length of the transducer. Each of these elements has a pair of spaced electrodes 55 and 56 interconnected by a layer 57 of photoelectric material. One dimension of the second light beam 27 shown in FIG. 1 is optically extended so that this beam 27 traverses all four photoelectric elements 50 to 53 as shown in FIG. 5.

If the beam 27 simultaneously impinges on all four photoelectric elements, electric current is enabled to flow from the source or battery 41 to the terminals A, B, C and D, since the electrodes 55 and 56 of all four electrode pairs are then interconnected by conductive regions of the layers 57.

To provide for a binary output, members 59, 60, 61 and 62 of opaque material are selectively spaced on the elements 50 through 53 so as to obscure these elements from the beam 27 at selected instances of its lateral travel. Accordingly, the binary output at terminals A to D is a function of the deflection of the beam 27 and thus a function of variations of the input signal applied at terminals 11 of the apparatus illustrated in FIG. 1.

For information on the nature of binary codes, reference may, for instance, be had to Phister, Logical Design of Digital Computers, (Wiley & Sons, 1958), pp. 230 to 233. That reference also deals on pages 232 to 234 with Gray code arrangements which may be employed in the transducer of FIG. 5 if desired.

Reverting to FIG. 1, a further advantage of the apparatus shown therein arises from the provision of two separate light sources 18 and 26 for the generation of the beams 17 and 27. This permits the source 18 to be of a type that emits actinic light to which the oscillograph paper is best responsive, while the source 26 may be of a type that emits a range of wavelength to which the transducer is particularly sensitive. While the sources 18 and 26 have been shown in FIG. 1 to be vertically aligned, it will be understood that they may also be angularly displaced with respect to each other, whereupon the transducer 30 is similarly displaced with respect to the recording surface of the medium 20.

If these advantages are not needed, an arrangement of the type shown in FIG. 2 may be employed. According to the modification of FIG. 2, a beam splitter or dichroic mirror 66 is located in the path of the above mentioned beam 17 to derive therefrom a beam 67. The beam 67 impinges on the transducer 30 and operates thereon in the same manner as the beam 27 in FIG. 1. The portion 17′ of the beam 17 which is angularly reflected by the mirror 66 impinges on the recording medium 20 to produce thereon an oscillogram of the type shown at 23 in FIG. 1.

If desired, a feedback circuit may be included in the apparatus of FIG. 1 or the modification of FIG. 2. Such a circuit is illustrated in FIG. 4.

According to FIG. 4, the digital output of the transducer 30 which is applied to the sampler 45 shown in FIG. 1 is also applied to a digital to analog converter 70 which may be of a conventional design and which supplies an analog feedback signal to the amplifier 16 which, according to FIG. 1, serves to amplify the input signal received at the terminals 11. The analog feedback signal corresponds to the output of the transducer 30 and varies therefore with the energization of the galvanometer coil 12. Accordingly, a closed-loop servo system is provided which has similar advantages than the servo system disclosed in U.S. Patent 3,321,766, issued May 23, 1967, to Charles E. Everest and assigned to the subject assignee.

In carrying the servo system of FIG. 4 into practice, the incremental response of the transducer 30 should be made such as to provide for a sufficiently continuous feedback signal at the amplifier 16. This may be done by providing a sufficient number of photoelectric elements 32 and electrodes 36 along the lateral trajectory of the beam 27.

I claim:

1. Recording apparatus comprising:

(a) means for generating a first beam and a second beam of electromagnetic radiation;

(b) means responsive to variable information for deflecting said first beam in a first plane and said second beam in a second plane by amounts of deflection corresponding to variations of said information;

(c) means for moving a recording medium through said first plane to provide on said recording medium a first information record by action of said first beam;

(d) means located to be intercepted by said second plane for producing electric signals corresponding to amounts of deflection of said second beam; and (e) means responsive to said electric signals for providing a second record of said information.

2. Apparatus as claimed in claim 1, wherein said electric signal responsive means include means for converting said electric signals into recordable indices, and for recording said indices on said recording medium.

3. Apparatus as claimed in claim 1, said electric signal responsive means include means for providing said second information record in marginal regions of said recording medium.

4. Apparatus as claimed in claim 1, wherein said recording medium is a photosensitive recording medium and said first beam is a beam of actinic light.

5. Apparatus as claimed in claim 1, wherein said beam generating means include means for generating a primary beam of electromagnetic radiation, and beam splitting means located in the path of said primary beam for providing said first beam and said second beam.

6. Apparatus as claimed in claim 5, wherein said primary beam is a beam of light, and said beam deflection means include galvanometer means having mirror means located in the path of said primary beam of light, and mirror drive means coupled to said mirror means for deflecting said mirror means by amounts of deflection correlated to variations of said information.

7. Apparatus as claimed in claim 1, wherein said first and second beams are beams of light, and said beam deflection means include galvanometer means having mirror means located in the paths of said first and second beams of light, and mirror drive means coupled to said mirror means for deflecting said mirror means by amounts of deflection correlated to variations of said information.

8. Apparatus as claimed in claim 7, wherein said mirror means comprise a single mirror for deflecting both said first and second beams.

9. Apparatus as claimed in claim 1, wherein said second beam is a beam of light, and said electric signal producing means include elongate photosensitive means extending through said second plane for providing electric signals varying as a function of the deflection of said second beam.

10. Apparatus as claimed in claim 1, wherein said electric signal producing means are constructed to provide electric signals varying as a function of the deflection of said second beam in said second plane.

11. Apparatus as claimed in claim 1, wherein said electric signal producing means are constructed to provide digital electric signals corresponding to said amounts of deflection of said second beam, and said means responsive to said electric signals include means for converting said digital electric signals into numerical or alpha-numerical indices.

12. Apparatus as claimed in claim 1, including means connected to said electric signal producing means for providing feedback signals corresponding to said electric signals, and for applying said feedback signals to said information responsive means.

13. Apparatus as claimed in claim 1, including means responsive to deflections of said second beam for producing feedback signals for said information responsive means.

14. In an oscillograph apparatus in which an oscillogram of a variable input signal is recorded on a light-sensitive recording medium by means of a beam of light reflected by a galvanometer mirror which is angularly deflected in response to said input signal, the improvement comprising means responsive to angular deflections of said galvanometer mirror for recording indices indicative of at least one predetermined characteristic of said input signal on said recording medium in addition to said oscillogram.

15. Apparatus as claimed in claim 14, wherein said deflection responsive means include means for translating angular deflections of a beam of light deflected by said galvanometer mirror into corresponding electrical signals, and means responsive to said electrical signals for recording said indices on said recording medium.

16. Apparatus as claimed in claim 15, wherein said translating means include elongate photosensitive signal generation means.

17. Apparatus as claimed in claim 14, wherein said deflection responsive means include means for providing a second beam of light that is angularly deflected by said galvanometer mirror.

18. Apparatus as claimed in claim 14, wherein said deflection responsive means include means for deriving a secondary beam of light from said beam of light reflected by said galvanometer mirror.

References Cited

UNITED STATES PATENTS

| | | | |
|---|---|---|---|
| 3,208,075 | 9/1965 | Casavant | 346—33 |
| 3,321,766 | 5/1967 | Everest | 346—32 |

RICHARD B. WILKINSON, *Primary Examiner.*

JOSEPH W. HARTARY, *Assistant Examnier.*

U.S. Cl. X.R.

346—109